(12) United States Patent
Grocutt

(10) Patent No.: US 9,251,378 B2
(45) Date of Patent: Feb. 2, 2016

(54) SECURITY PROTECTION OF SOFTWARE LIBRARIES IN A DATA PROCESSING APPARATUS

(71) Applicant: ARM Limited, Cambridge (GB)

(72) Inventor: Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/220,499

(22) Filed: Mar. 20, 2014

(65) Prior Publication Data
US 2014/0373171 A1   Dec. 18, 2014

(30) Foreign Application Priority Data
Jun. 12, 2013  (GB) .................... 1310421.1

(51) Int. Cl.
G06F 21/74  (2013.01)
G06F 21/71  (2013.01)

(52) U.S. Cl.
CPC ............... *G06F 21/74* (2013.01); *G06F 21/71* (2013.01)

(58) Field of Classification Search
CPC .................................. G06F 21/71; G06F 21/74
See application file for complete search history.

(56) References Cited

U.S. PATENT DOCUMENTS 6,282,657 B1    8/2001  Kaplan et al.
6,789,200 B1    9/2004  Fiveash et al.
7,082,615 B1    7/2006  Ellison et al.
2002/0051536 A1* 5/2002  Shirakawa et al. ............. 380/45
2006/0288420 A1 12/2006  Mantripragada et al.
2007/0113079 A1  5/2007  Ito et al.
2007/0220276 A1  9/2007  Croxford et al.
2007/0283146 A1* 12/2007  Neveux .......................... 713/166
2008/0196081 A1* 8/2008  Hajji et al. ........................ 726/1
2009/0172411 A1  7/2009  Kershaw et al.
2009/0210874 A1  8/2009  Harris et al.
2010/0132053 A1  5/2010  Chishima

FOREIGN PATENT DOCUMENTS

EP    1 890 237    2/2008
GB    2 396 034    6/2004

OTHER PUBLICATIONS

International Search Report and Written Opinion of the International Searching Authority mailed May 13, 2014 in PCT/GB2014/050747.
ARM Limited, "Cortex-M3 Technical Reference Manual" Revision: r1p1, pp. 5-1 to 5-36, 2006.

(Continued)

*Primary Examiner* — Robert Leung
(74) *Attorney, Agent, or Firm* — Nixon & Vanderhye P.C.

(57) ABSTRACT

A processing apparatus 2 has a secure domain 90 and a less secure domain 80. Security protection hardware 40 performs security checking operations when the processing circuitry 2 calls between domains. A data store 6 stores several software libraries 100 and library management software 110. The library management software 110 selects at least one of the libraries 100 as an active library which is executable by the processing circuitry 4 and at least one other library 100 as inactive libraries which are not executable. In response to an access to an inactive library, the library management software 110 switches which library is active.

23 Claims, 10 Drawing Sheets

(56) References Cited

OTHER PUBLICATIONS

Kumar, R. et al., "A System for Coarse Grained Memory Protection in Tiny Embedded Processors", Design Automation Conference, (2007), DAC'07. 44$^{th}$ ACM/IEEE. IEEE, 2007.

Uk Search Report for GB Application 1310421.1, dated Nov. 29, 2013, GOLDING, Jonathan, 3 pages.
International Preliminary Report on Patentability mailed May 15, 2015 in PCT/GB2014/050747, 7 pages.

* cited by examiner after Call 1:

after Call 2/3:

after Ret 2/3:

on Ret 1:
- fn return to dummy add A → dummy add B → exception !
- switch to lib 0 from lib 1
- read return address from lib 0 stack
- check verification (1) matches library just switched from (1) ✓
- → return to return address

SECURITY PROTECTION OF SOFTWARE LIBRARIES IN A DATA PROCESSING APPARATUS

CROSS-REFERENCE TO RELATED APPLICATIONS

This application claims priority to GB Application No. 1310421.1, filed 12 Jun. 2013, the entire contents of which is incorporated herein by reference.

BACKGROUND OF THE INVENTION

1. Field of the Invention

The present invention relates to the field of data processing. More particularly, the invention relates to security protection of software libraries in a data processing apparatus.

2. Description of the Prior Art

A data processing apparatus may have a secure domain and a less secure domain. When operating in the secure domain, data can be accessed that is not accessible when operating in the less secure domain. This provides a way of protecting potentially sensitive data and code from access by unauthorized persons or programs.

However, there is an increasing need to protect multiple software applications from each other. As the number of applications increases, it becomes more complex to maintain security. The present technique seeks to address this problem.

SUMMARY OF THE INVENTION

Viewed from one aspect, the present invention provides a data processing apparatus comprising:

processing circuitry for performing data processing in response to instructions, the processing circuitry having a plurality of domains of operation including a secure domain and a less secure domain, wherein at least some data accessible to the instructions when operating in the secure domain is inaccessible when operating in the less secure domain;

security protection hardware configured to perform a first security protection operation in response to the processing circuitry calling between the less secure domain and the secure domain; and a data store configured to store a plurality of software libraries and library management software for execution by the processing circuitry; wherein:

the library management software is configured to control the processing circuitry to set at least one of the plurality of software libraries as an active software library which is executable by the processing circuitry, and to set at least one other software library as an inactive software library which is not executable by the processing circuitry; and in response to the processing circuitry calling a target inactive software library, the library management software is configured to perform active library switching to control the processing circuitry to set the target inactive software library as an active software library and to set a previously active software library as an inactive software library.

It may be desirable to provide multiple different software libraries in a processing apparatus. The libraries may be provided by different software vendors who may not trust each other and so it may be desirable to enforce security between the libraries. An option would be for all security checking between software libraries to be handled in software, for example using an operating system. However, this approach tends to be slow because the processing of the processing circuitry must be interrupted to invoke the operating system security behaviour each time there is a function call to a protected library. On the other hand, a fully hardware-implemented solution could implement each software library as a separate security domain and use dedicated hardware to enforce security between the libraries. However, the number of software libraries existing on the same device may be large and so the amount of dedicated hardware resource for maintaining each library as a separate domain can be expensive in terms of circuit area and power consumption.

To address these problems, the present technique provides a hybrid approach using dedicated security protection hardware and library management software. The security protection hardware controls calls between a less secure domain and a secure domain. When calling between domains, the security protection hardware can perform a first security protection operation, which may include various measures for ensuring that less secure code cannot access secure data or secure code without permission. On the other hand, switching between different software libraries within a domain is controlled using library management software executed by the processing circuitry itself. The library managements software selects at least one of the software libraries as an active library and at least one other software library as an inactive software library. Software libraries which are designated as inactive are not executable by the processing circuitry, and security critical resources associated with that library are not accessible to the active library. If the processing circuitry attempts to call to an inactive software library, then the library management software controls the processing circuitry to switch which library is active so that the required library becomes active and the previously active library becomes inactive. Hence, the library management software effectively virtualizes the security protection protocols between different software libraries so that the system behaves as if the processing circuitry has many protection domains each corresponding to different protected libraries, while from the hardware point of view there are fewer domains with one software library being selected as an active library at a time.

This approach is faster than a fully software-implemented approach, because the dedicated security protection hardware allows function calls to be made directly to an active software library in the other domain without invoking software on the processing circuitry. Repeated calls to the same active library do not invoke the library management software, and any security precautions associated with calling between the less secure domain and the secure domain can be controlled quickly in hardware with little interruption to the processing being performed by the processing circuitry. The performance overhead of switching between libraries using the library management software is only encountered when an inactive library is required. In practice, this does not happen often in comparison to calls to an already active library, and so the overall performance is close to that achieved by a fully hardware implemented approach, but with less hardware overhead.

Each software library may include both instructions and data associated with that library. For example, a library may represent a particular application such as a banking or virtual payment application.

When the processing circuitry calls to an inactive software library, then the library management software may control the processing circuitry to perform a second security protection operation. If this second security protection operation is unsuccessful then an error can be triggered, while if it is successful then the active library switching may be performed to make the target library active. Hence, in addition to the first security protection operation performed in hardware if there is a cross-domain call, an additional layer of security protection may be provided by the library management software. The second security protection operation may be performed even if there is no cross-domain call which is monitored by the security protection hardware. For example, a software library may only allow another software library to branch to certain points of the library code, and if another software library attempts to branch to a location in the library which is not at a valid entry point then an error can be triggered by the library management software. Also, only certain libraries may be trusted to branch to a given library, with an error being triggered if the library management software detects a non-trusted library calling the library.

To maintain security, it may be desirable for the library management software to select one library as the active library and to select the other libraries as an inactive library, so that one library is active at a time and securely controlled library switching is required in order for libraries to interact with each other.

On the other hand, it may be preferred to maintain multiple active libraries and the other libraries as inactive. For example, it may only be necessary to protect some libraries from intrusion and other libraries may not need to be protected. In this case, some libraries could be made permanently active. Also, there may be a set of libraries which are trusted to interact with each other, and so when one of these libraries is active the other libraries are also made active. Also, there may be different subsets of libraries, and within each subset of libraries one active library can be selected with the other libraries in the subset being inactive. Also, as the security protection hardware can enforce security between the secure domain and the less secure domain, it is possible to designate one active library in the secure domain and one active library in the less secure domain, which still cannot access each other without permission due to the protection provided by the hardware. Therefore, there are a number of reasons why it might be desirable to set multiple libraries as active simultaneously. In general, the library management software may ensure that an inactive library is prevented from being accessed inappropriately by an active library.

While the present technique can be used in the less secure domain, it is most useful in the secure domain which will typically be used for software libraries which are likely to process sensitive information. Therefore, in one example the managed software libraries may be secure software libraries in the secure domain, with the library management software not managing any libraries in the less secure domain. Alternatively, separate secure and less secure library managers may be provided for handling switching between libraries in the secure domain and less secure domain respectively.

A memory protection unit (MPU) may be used to control which libraries are active or inactive. The MPU can be used to designate regions of the data store as accessible or inaccessible, with accesses to inaccessible regions triggering a fault condition. Hence, the active library switching by the library management software may include updating the access permissions in the MPU to indicate different regions as accessible or inaccessible. If an inactive library is accessed, the corresponding memory region is indicated as inaccessible in the MPU, and so the MPU may generate a fault which can trigger the library management software to perform the active library switching.

The active library switching may also include updating a stack pointer in a stack pointer storage location to correspond to the newly active library. A stack may be provided in the data store for at least some of the software libraries. When active, the library can use the stack to store temporary data. Not all libraries need to have stacks allocated in the data store, since stacks can be allocated dynamically as libraries are switched from the inactive state to the active state. Each allocated stack has a corresponding stack pointer which identifies its location in memory. The exact location indicated by the stack pointer may vary. For example, the stack pointer may indicate the location of the last data value placed on the stack, or the location to which the next data value placed on the stack should be written. By updating the MPU and stack pointer when switching from one library to another, the newly active library cannot access the stack associated with the previously active library, which may be sensitive data. If multiple libraries are allowed to be active simultaneously, then multiple stack pointer registers may be provided. For example, there may be a secure stack pointer storage location and a less secure stack pointer storage location which store stack pointers for the currently active secure library and less secure library respectively.

The security protection hardware may have a security protection unit which stores security data defining secure and less secure regions of the data store associated with the secure domain and less secure domain respectively. The current domain of operation of the processing circuitry may be selected based on whether the instruction currently being processed is in the secure region or the less secure region of the data store. Typically code that is located in the secure region would execute the secure domain while code located in the less secure region would execute in the less secure domain, although there may be some exceptions. When a branch instruction attempts to branch from a location associated with one of the secure and less secure domains to a location associated with the other domain, then the first security protection operation may be performed by the security protection hardware.

The first security protection operation may include several different measures for preventing inappropriate access to secure information. Some measures may only be required when calling from the secure domain to the less secure domain, or vice versa.

For example, the first security protection operation may include checking whether a first instruction to be executed following a protected change of program flow is an allowed target instruction for that change of program flow. This can be particularly useful when the protected change of program flow is a branch to an instruction to be executed in the secure domain. It can be dangerous to allow branches to jump to the middle of a secure function because this may allow security precautions such as a password check provided earlier on in the secure function to be circumvented. To prevent this, a predetermined instruction (e.g. a special guard instruction) may be designated as an allowed target instruction for the change of program flow, and the allowed instruction may be included in the secure code to mark the allowed function entry points. Following a protected change of program flow (e.g. a branch to an instruction in the secure region), the security protection hardware can check whether the first instruction to be executed following the call is the allowed target instruction. If not, then a security fault can be triggered.

Also, the first security protection operation may include protection of function return addresses following a protected function call. For example, if a function is called from code in the secure domain and targets code in the less secure domain, then it would be undesirable to allow the code in the less secure domain to access the return address of the function. If the less secure function were able to modify the return address then it would be able to affect the program flow of the secure code, which could lead to security protections being circumvented by jumping into the middle of secure functions. To prevent this, the hardware may take steps to hide the function of return address from the instructions executed after the function call. For example, the return address may be stored to a stack associated with the secure code which called the function, which cannot be accessed by the code in the less secure domain.

The first security protection operation may also include checking whether, following a change of program flow, the domain to which processing has been switched is an allowed domain specified for that change of program flow. There are certain security attacks in which less secure code can cause a branch instruction in the secure domain which is expected to branch to the less secure domain to instead branch to a location in the secure domain, allowing less secure code to make uncontrolled changes of program flow in the secure domain. To prevent this, at least one allowed domain may be specified for certain changes of program flow, and following the change of program flow the hardware may check whether the destination domain matches the allowed domain. The first security protection operation may also include security checks and operations other than those described above.

The security protection hardware provides measures for ensuring security when calling between the less secure domain and the secure domain. However, these measures may also be desired when calling between different software libraries within the same domain. This can be achieved in different ways. In one example, when calling between libraries in the same domain, the processing circuitry may temporarily switch to the other domain before switching back again to the original domain. The temporary switch of domains makes the library call appear as a call between the secure domain and the less secure domain even though both libraries are actually in the same domain, and so triggers the hardware to perform the first security protection operation so that the same security measures performed when calling between domains can also be used when calling between libraries in the same domain.

For example, to invoke the security protection hardware when calling between libraries in the same domain, the active library may execute a branch instruction which specifies a target address of a location within the target inactive library together with an indication that the system should switch to the other domain when carrying out the branch. This causes the system to switch to the other domain for a period before switching back when it is determined that the target location is actually associated with the original domain. This approach has the advantage that the security measures for the switch of libraries are performed quickly in hardware.

Alternatively, the system may remain in the current domain when calling between two libraries in the same domain and the library management software may perform the first security protection operation. Any operations which would normally be performed by the security protection hardware when calling between different domains can be performed instead by the library management software executing on the processing circuitry. This avoids the need for a special mechanism for temporarily switching between domains as in the previous example, and ensures that operands passed between the libraries do not become accessible to the less secure domain.

As mentioned above, part of the first security protection operation provided by the security protection hardware may be hiding the function return address from subsequent software following a function call. This may also be performed by the library management software when there is a switch between libraries in the same domain. This need not be performed for all function calls—it may be enough to hide the function return address only for certain protected function calls. One way of achieving this is to store the function return address to a stack associated with the active software library before switching from that library.

This approach is in contrast to the usual method of storing a function return address to a link register which is accessible to all libraries. A dummy function return address can be stored to the link register instead. The dummy function return address does not correspond to a valid instruction address, which indicates that when a function return is made to the dummy address, the security protection hardware should read the actual function return address from the stack associated with the active software library and then trigger the function return to the actual function return address.

However, after storing the actual function return address to the stack, there may then be a switch to another software library which may cause the stack pointer to be swapped. Therefore, when returning from the function call, the stack storing the function return address may not be accessible anymore. To address this problem, after a protected function call has been made, the library management software may set information to indicate that there has been a switch to another software library. On the corresponding function return, the library management software may check the information to see if there has been a library switch, and if so may perform active library switching back to the original library so that the function return address can be accessed from the stack.

The information set to indicate that there has been a switch of active libraries may have various forms. For example, this information may be an invalid return address which does not correspond to a valid instruction address (e.g. a different invalid address to the dummy return address stored to the link register by the hardware). For example, the invalid return address may be stored to a stack of the other software library to which processing is switched after the protected function call has been made. The use of the invalid return address by the other software library causes a fault, which may be used to trigger the library management software to perform active library switching back to the original library.

Also, the library management software may maintain status information indicating which of the software libraries made the protected function call. On returning from the protected function call, if the library indicated by the status information is currently inactive, then the library management software can switch to the library indicated by the status information. This allows the system to determine the stack from which the return address should be obtained. If there are only two libraries managed by the library management software then the status information may not be essential.

The status information can be stored when making the protected function call, or could be stored later when switching to a different active library. In one example, the status information may indicate at least a partial history of functions that were called so that later on it is possible to backtrack to identify the library which called original function. However, monitoring the function call tree may be complex as there could be many nested functions which are processed before returning the original function call, it may be simpler to store an indication of the original caller library without tracking all the subsequent processing of functions. One way of doing this is to store the status information to a stack associated with the other software library.

If the status information is stored to a location which is accessible by another software library, then the other library may be able to modify the status information, which could cause unpredictable and insecure operations. To prevent this, the library management software may control the processing circuitry to store verification information to the stack of the library which made the protection function call. This verification information can be used on a function return to check that the status information has not been modified. For example, the verification information may comprise an indication of which library is the other library whose stack stores the status information. If the status information is modified by the software then the function return may no longer return to the original caller library and the library to which processing is switched instead may not have the correct verification information, allowing the modification to be detected and an error to be raised.

While a secure domain and a less secure domain are discussed above, the apparatus may also have further domains, with the security protection hardware controlling transitions between domains. Hence, the secure domain and less secure domain mentioned above may be two of a greater number of domains. There may be an active library in each of the domains, so that there can be multiple active libraries simultaneously.

Viewed from another aspect, the present invention provides a data processing apparatus comprising:

processing means for performing data processing in response to instructions, the processing means having a plurality of domains of operation including a secure domain and a less secure domain, wherein at least some data accessible to the instructions when operating in the secure domain is inaccessible when operating in the less secure domain;

security protection hardware means for performing a first security protection operation in response to the processing means calling between the less secure domain and the secure domain; and storing means for storing a plurality of software libraries and library management software for execution by the processing means; wherein:

the library management software is configured to control the processing means to set at least one of the plurality of software libraries as an active software library which is executable by the processing means, and to set at least one other software library as an inactive software library which is not executable by the processing means; and in response to the processing means calling a target inactive software library, the library management software is configured to perform active library switching to control the processing means to set the target inactive software library as an active software library and to set a previously active software library as an inactive software library.

Viewed from another aspect, the present invention provides a method of data processing for an apparatus comprising processing circuitry having a plurality of domains of operation including a secure domain and a less secure domain, wherein at least some data accessible to the instructions when operating in the secure domain is inaccessible when operating in the less secure domain, and a data store storing a plurality of software libraries and library management software for execution by the processing circuitry; the method comprising:

under control of the library management software, the processing circuitry setting at least one of the plurality of software libraries as an active software library which is executable by the processing circuitry and setting at least one other software library as an inactive software library which is not executable by the processing circuitry;

in response to the processing circuitry calling between the less secure domain and the secure domain, the security protection hardware performing a first security protection operation; and in response to the processing circuitry calling a target inactive software library, the library management software performing active library switching to control the processing circuitry to set the target inactive software library as an active software library and to set a previously active software library as an inactive software library.

The above, and other objects, features and advantages of this invention will be apparent from the following detailed description of illustrative embodiments which is to be read in connection with the accompanying drawings.

BRIEF DESCRIPTION OF THE DRAWINGS

The above, and other objects, features and advantages of this invention will be apparent from the following detailed description of illustrative embodiments which is to be read in connection with the accompanying drawings, in which.

DESCRIPTION OF EXAMPLE EMBODIMENTS

Figure 1:
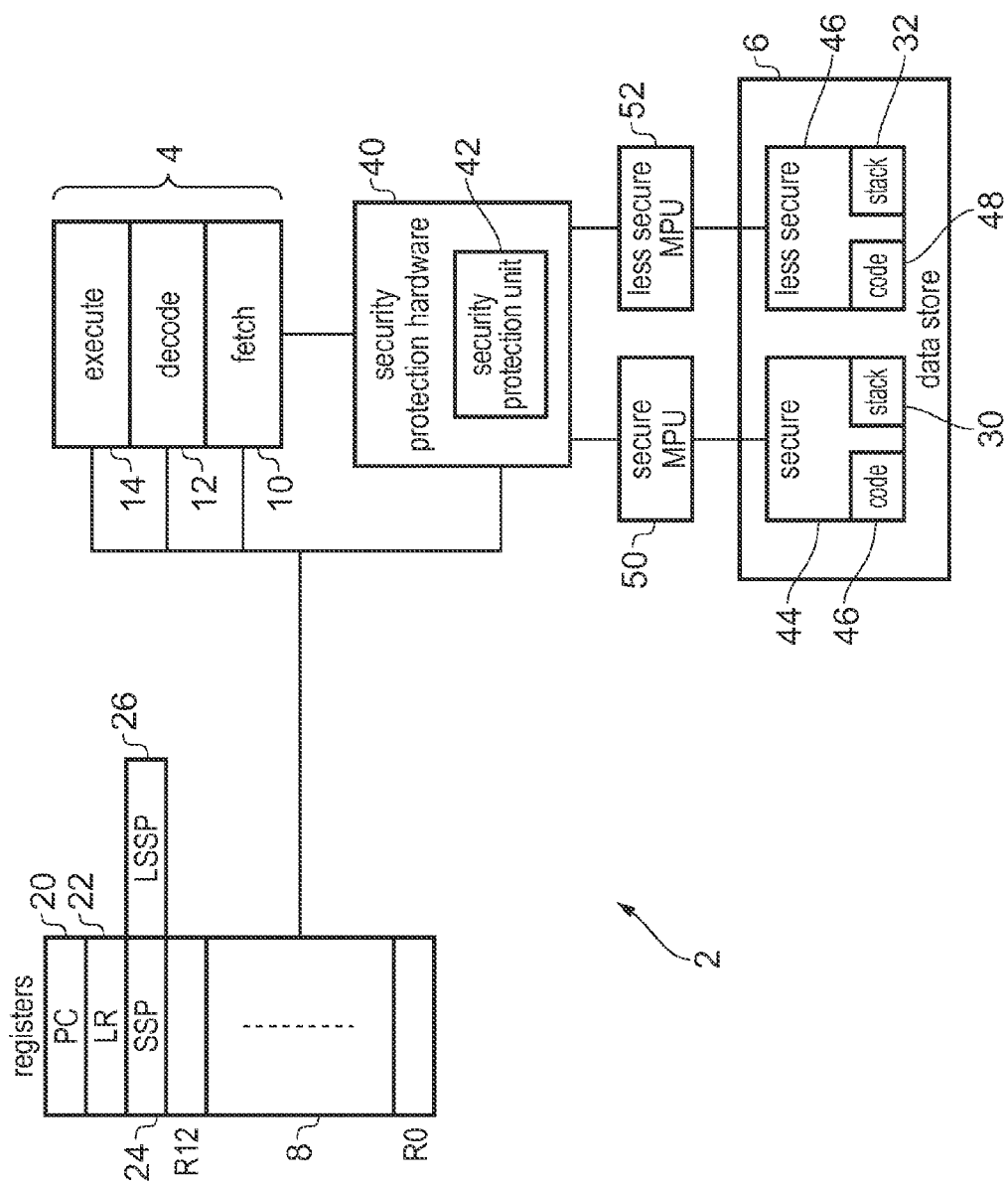
FIG. 1 illustrates a data processing apparatus having security protection hardware.

FIG. 1 schematically illustrates a data processing apparatus 2 comprising processing circuitry 4, a data store 6 and registers 8. The data store 6 may include at least one cache as well as a memory. The processing circuitry 4 comprises a processing pipeline which includes a fetch stage 10 for fetching instructions from the data store 6, a decode stage 12 for decoding the fetched instructions, and an execute stage 14 for executing the decoded instructions. It will be appreciated that the pipeline may include other stages, for example a register renaming stage or issue stage.

The registers 8 include several general purpose registers $R_0$ to $R_{12}$ for storing data on behalf of the processing circuitry 4. While FIG. 1 shows 13 general purpose registers $R_0$ to $R_{12}$, other numbers of registers may be provided, and optionally floating point registers for storing floating point values could also be provided. The registers 8 also include some special purpose registers including a program counter (PC) register 20, a link register (LR) 22 and stack pointer (SP) registers 24, 26. The program counter register 20 stores a program counter indicating the address of the next program instruction to be executed by the processing circuitry 4. Generally, following execution of an instruction the program counter will be updated to indicate the next instruction from memory. However in response to a control flow altering instruction the program counter can be set to a value which does not follow sequentially from the previous value. The link register 22 may store a return value used when returning from a function or an exception to determine which program instruction should be processed following completion of the function or exception. The stack point registers 24, 26 store secure and less secure stack pointers respectively, which point to a secure stack 30 and less secure stack 32 in the data store 6. For example, the stack pointers can indicate the location of the last item placed on the stack 30, 32, or can indicate the next location to which a data value placed on the stack 30, 32 should be written.

Security protection hardware 40 is provided to enforce separation between a secure domain and a less secure domain. The security protection hardware has a security protection unit 42 which stores protection data defining, for each region of the data store 6, whether the region is a secure region or a less secure region. FIG. 1 shows an example in which the data store 6 has one secure region 44 and a less secure region 46, but in practice the data store 6 may include several regions of each type. Code 46 located within the secure region 44 of the data store 6 is executed by the processing circuitry 4 in the secure domain while code 48 located within the less secure region 46 is executed in the less secure domain. When in the less secure domain, the processing circuitry 4 cannot access data or instructions stored in the secure region 44. Transitions between the less secure domain and the secure domain are controlled by the security protection hardware 40 to ensure that only certain allowed transitions are accepted.

The data processing apparatus 2 comprises a secure memory protection unit (MPU) 50 and a less secure MPU 52 for defining access permissions for the secure and less secure regions 44, 46 of the data store 6 respectively. The access permissions control whether sub-regions of the secure and less secure regions 44, 46 are accessible or inaccessible. The regions defined by the secure MPU 50 and less secure MPU 52 may overlap. For example, the secure MPU 50 and less secure MPU 52 may define different attributes for the same memory region.

Figure 2:
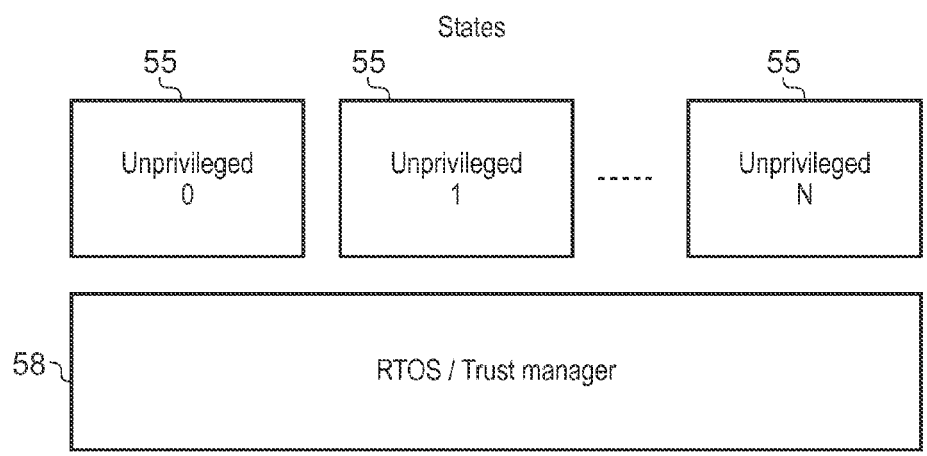
FIG. 2 illustrates a software technique for maintaining security between software libraries.

FIG. 2 shows a software technique for maintaining separation between different software libraries 55. Different software libraries 55 may be provided by different, mutually distrustful, software vendors, and so access by one library 55 to data or code associated with another library 55 may need to be prevented. A real time operating system 58 or trust manager may be provided to manage switches between the software libraries 55. When one library seeks to access data or code associated with another library that is defined as protected by the operating system 58, MPU hardware may check whether this is allowed and if not may trigger a fault. In such an implementation, the security protection hardware 40 of FIG. 1 is not provided. When switching libraries, processing on the processing circuitry 4 needs to be interrupted so that a security handler in the operating system 58 can be executed. This reduces processing performance of the processing circuitry 4 and so this technique is slow compared to hardware techniques.

Figure 3:
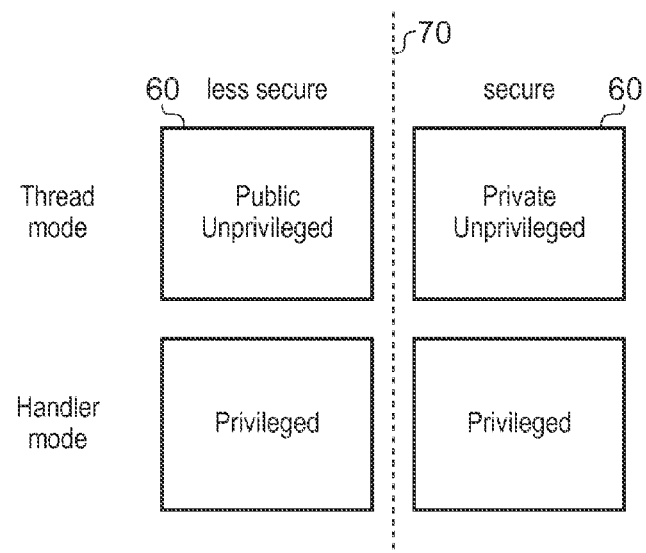
FIG. 3 illustrates a hardware technique for maintaining security between software libraries.

On the other hand, FIG. 3 shows an example of a hardware technique for separating different domains. In this case, the security protection hardware 40 maintains the boundary 70 between a less secure domain and a secure domain and each software library 60 has its own domain. As the security of transitions between the domain is controlled by the hardware, the transitions between libraries are fast and it is not necessary to invoke a software handler. However, it is difficult with the hardware implementation of FIG. 3 to maintain a large number of different, mutually protected, software libraries, because the amount of data stored in the security protection unit 42 becomes very large, and so in practice this limits the number of different domains that can be supported.

Figure 4:
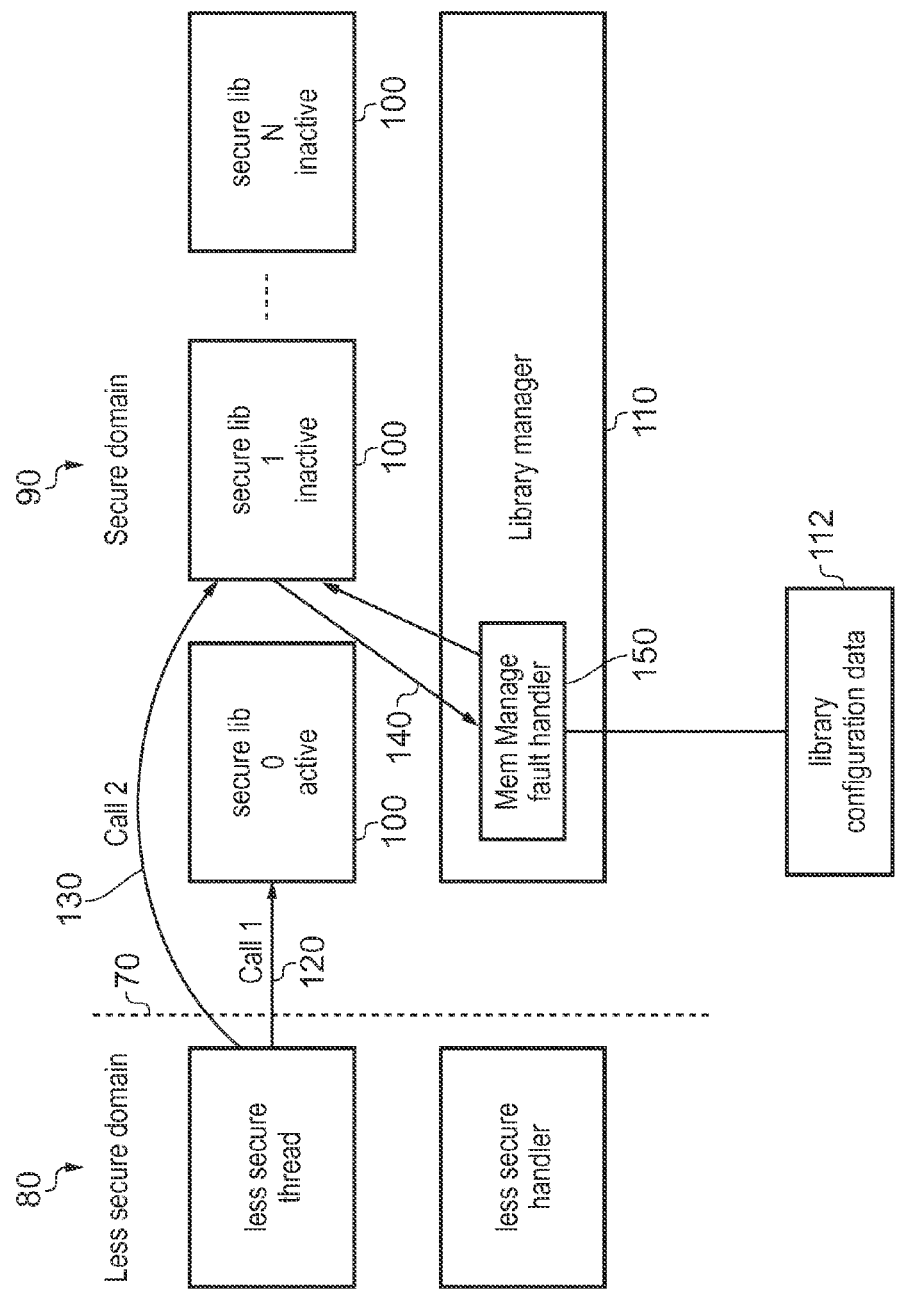
FIG. 4 illustrates a hybrid technique using software to partition different software libraries in the secure domain and hardware to separate the secure domain from the less secure domain.

To address these issues, FIG. 4 shows a hybrid hardware/ software technique which enables many mutually distrusted software libraries to be maintained in a more hardware efficient way than the technique shown in FIG. 3 but with greater performance than the approach shown in FIG. 2. The security protection hardware 40 provides security protection for maintaining the boundary 70 between the less secure domain 80 and secure domain 90. Multiple secure software libraries 100 are executed in the secure domain, and are protected from accessing each other using the secure MPU 50 and library management software 110 which is also executed in the secure domain. The library management software 110 manages transitions between the different secure libraries 100. The library management software 110 selects one or more libraries 100 as an active library and selects other libraries as inactive. For example, in FIG. 4 the secure library 0 is set as the active library and the other libraries 1 to N are inactive. The active and inactive libraries can be selected by setting the MPU permissions in the secure MPU 50 so that a region corresponding to an active library is accessible and a region corresponding to an inactive library is inaccessible. Library configuration data 112 is used by the library management software 100 to determine the access permissions to be written to the secure MPU 50 when certain libraries are active.

When a function call 120 is made from software in the less secure domain 80 to an active library then the security protection hardware 40 performs security checking operations. Since the security checking is performed in hardware, it is fast and the function call 120 can be made directly to the secure library 100 without other software routines having to be performed first by the processing circuitry 4.

On the other hand, if a function call 130 is made from code in the less secure domain 80 to an inactive library 100 in the secure domain 90, then a memory protection fault will be triggered by the secure MPU 50 because the region corresponding to the inactive library is currently set as inaccessible. A memory manage exception 140 is triggered by this fault and this invokes a fault handler 150 in the library manager 110 which causes the active library to be switched so that now the library targeted by function call 130 (library 1 in this example) becomes the active library while the previously active library (library 0 in this example) becomes inactive. The fault handler 150 switches the configuration of the secure MPU 50 based on the library configuration data 112 so that subsequent function calls to the newly active library will be allowed and function calls to the old library which is now inactive will now trigger a fault. Also, the fault handler 150 changes the stack pointer in the secure stack pointer register 24 to indicate a stack in the data store 6 associated with the newly active library instead of a stack associated with the previously active library. This ensures that the new library can access the stack associated with it. If the new library does not already have a stack, then a stack is allocated in the secure region 44 of the data store 6. The library manager 110 can also perform some software security checks to determine whether the switch of libraries is permitted. Meanwhile, since the function call 130 crossed the domain boundary 70, the hardware security measures are again provided by security protection hardware 40 in a similar way to function call 120.

Therefore, the library manager 110 virtualizes different secure libraries 100 operating in the same hardware security domain so that only some libraries are active at a time and the active libraries are prevented from accessing inactive libraries, with calls to inactive libraries being managed by the library manager 110 to ensure security. The overhead of changing the secure MPU 50 configuration using the library manager 110 is only encountered when a call is made to an inactive library and subsequent calls to the same library do not cause a fault 140 and have minimal overheads. This allows an almost unlimited number of protection domains corresponding different software libraries 100 to be supported.

Figure 5:
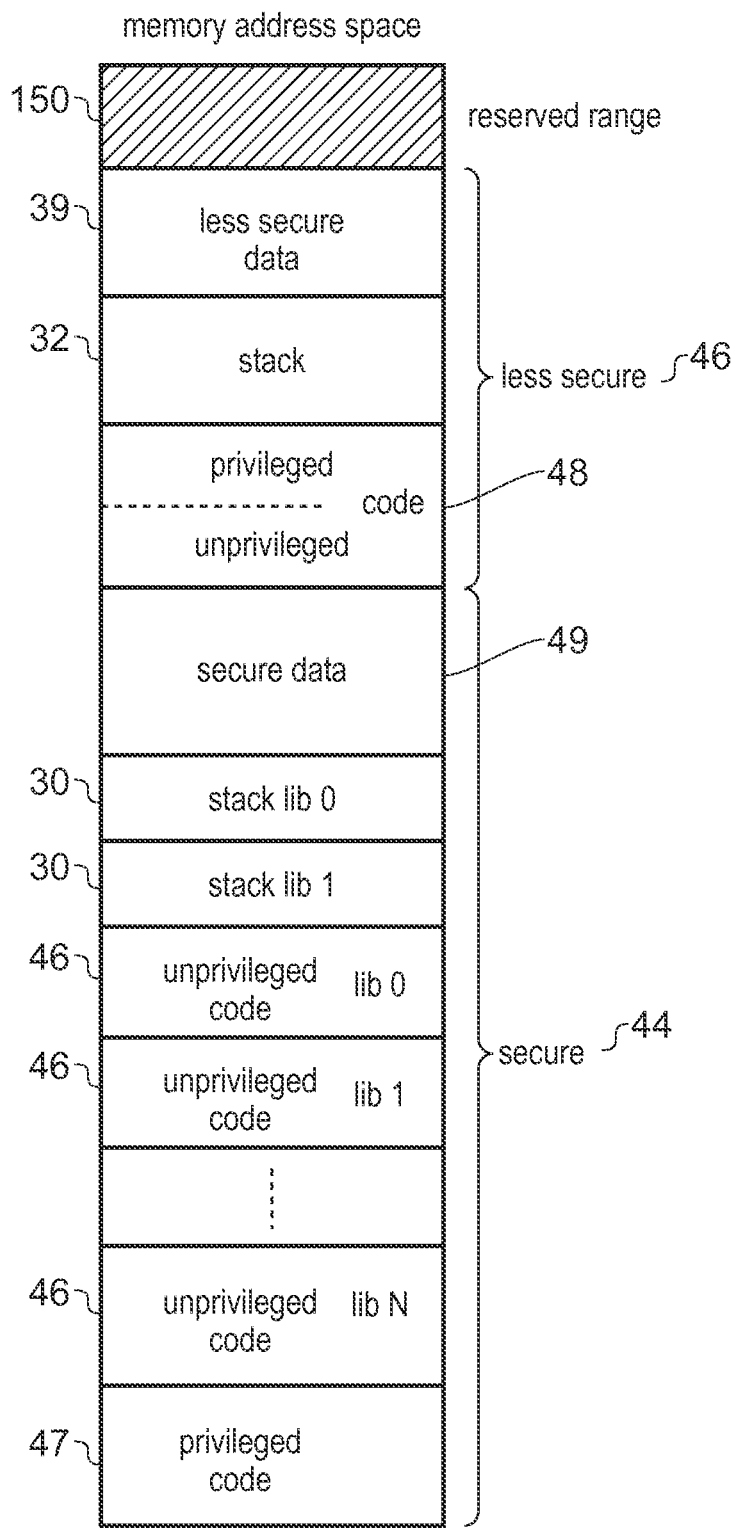
FIG. 5 illustrates an example of an address space having a secure region and a less secure region.

FIG. 5 shows an example of the memory address space of the data store 6. The address space bias a secure region 44 and a less secure region 46. While FIG. 5 shows one less secure region 44 and one secure region 46, a greater number of secure regions and less secure regions could be provided. The security protection unit 42 stores data defining which regions of the data store 6 are secure regions and which regions are less secure regions.

The secure region 44 includes one or more secure stacks 30 corresponding to at least some of the secure software libraries 100. It is not necessary to provide stacks in the address space for all of the software libraries 100. Instead, stack storage space can be allocated to libraries 100 as the libraries become active. The secure region 34 also comprises unprivileged secure code 46 corresponding to the software libraries 100 and privileged secure code 47 corresponding to the library management software 110. The secure MPU 50 controls which code and data is unprivileged or privileged.

Similarly, the less secure region 46 includes less secure code 48 (including privileged and unprivileged code) for executing in the less secure domain 80, a less secure stack 32 used by the less secure code 48, and less secure data 39. Less secure MPU 52 controls whether data or code in the less secure region 46 is privileged or unprivileged. Typically, unprivileged code cannot access privileged data or code.

The memory address space also includes a reserved address range 150 which does not correspond to any valid instruction address. This reserved range can be used for special functions, such as dummy return addresses as shall be described below. For example, the reserved address range 150 may comprise addresses in the range 0xF0000000 to 0xFFFFFFFF.

When crossing the boundary 70 between the less secure domain 80 and secure domain 90, the security protection hardware 40 performs security protection operations, which may include at least one of the following:

The security protection hardware 40 may generate a fault if, following a branch to the secure domain 90 from the less secure domain 80, the instruction at the branch target address does not contain a guard instruction representing a valid entry point into the secure code. This prevents attacks where less secure code attempts to branch to the middle of a secure function, which can be dangerous because it could allow security checks performed earlier in the function (e.g. password checks) to be avoided, allowing secure operations to be carried out without the proper security authorization.

When a branch is executed by a library in the secure domain 90 and causes a transition to the less secure domain, then the return address is automatically pushed to the stack associated with that library 100 and a reserved dummy value from the reserved address range 150 is placed in the link register 22. When a subsequent function return branches to the dummy value, then this is detected by the security protection hardware 40, which fetches the actual return address from the stack of the secure library 100. This prevents a secure address being accessible to non-secure code. This is described in more detail below with respect to FIG. 11.

When a secure function is called from the less secure domain 80, the function return address provided by public code can be modified by the security protection hardware 40 to indicate that processing will return to the less secure domain 80 when returning from the function. For example, a target domain bit can be set in the return address to indicate that the function return should return to the less secure domain 80. When carrying out the function return, it can be checked whether the function return address actually corresponds to a location that is callable from the domain indicated by the set target domain bit, and if not, then a fault can be triggered. This prevents attacks where a hacker modifies the function return address passed by the less secure domain 80 to try to trigger an uncontrolled transition from the secure domain to other secure code. This can be dangerous because a secure-secure branch would not typically be policed by the security protection hardware 40. By sanitizing the function return address passed from the less secure domain before the function return is carried out, such attacks can be prevented.

Figure 6:
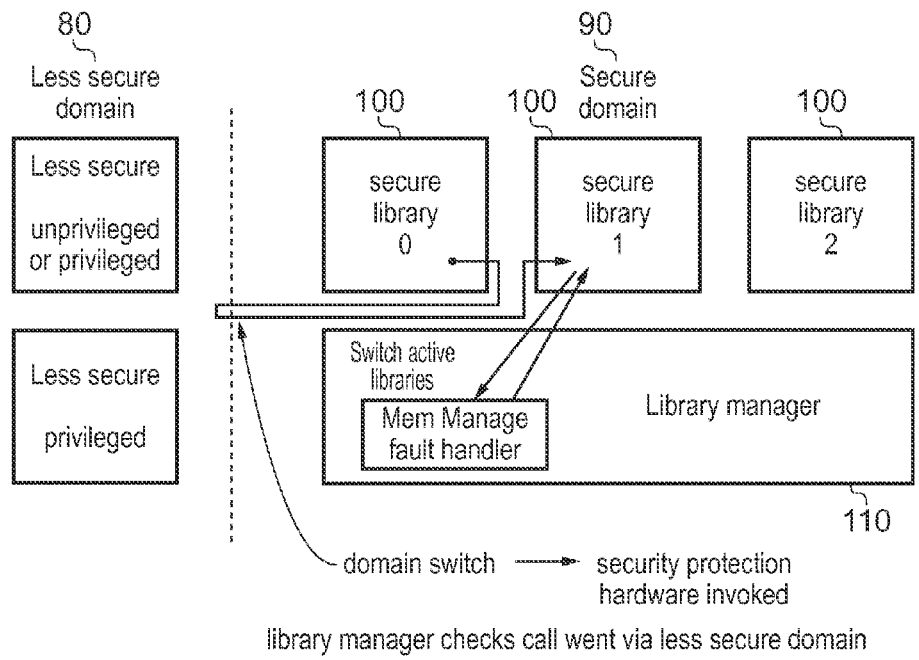
FIG. 6 illustrates a first example of switching between different secure libraries in the secure domain.
Figure 7:
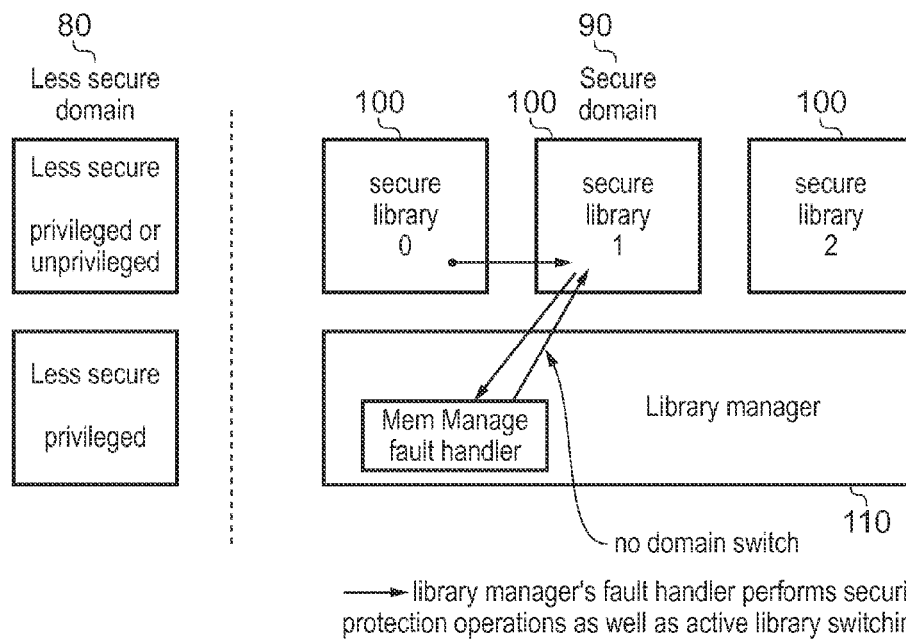
FIG. 7 illustrates a second example of switching between different secure libraries in the secure domain.

Therefore, various security measures can be taken by the hardware 40. However, it may also be desirable to provide the same protection when switching between secure libraries 100 within the secure domain 90, as if these libraries are implemented in separate hardware protection domains. FIGS. 6 and 7 show different techniques for achieving this.

In FIG. 6, a function call from a first secure library 0 to a second secure library 1 causes a switch to the less secure domain 80 before switching back to the second secure library 1 in the secure domain 90. By temporarily switching to the less secure domain 80, the call to the second secure library appears to the hardware 40 as if it is a switch from the less secure 80 to the secure domain 90, and so the hardware protection measures described above are performed by the security protection hardware 40 in the same way as would be the case if less secure code called the second secure library 1. The library manager 100 checks that the call went via the less secure domain, but otherwise does not need to perform the security measures performed by the hardware 10. One way to trigger the temporary switch of domains is to set the target domain bit discussed above in the target address of the function call to indicate the less secure domain 80 while the actual target address corresponds to a location in the secure domain 90 corresponding to secure library 1.

However, when switching to the less secure domain 80, any operands being passed between the two secure libraries may be visible to less secure code. An attacker may be able to trigger an interrupt when the processor is in the less secure domain 80, to gain access to any operands being passed via the stack or via registers. For some applications, this may not matter. For some software applications, the software vendors may require the security protection between libraries 100 to stop competitors cloning their software code, rather than to protect access to data. For such applications, the technique shown in FIG. 6 may be acceptable and it may not matter whether data processed by the secure libraries is accessible in the less secure domain.

However, for other applications (e.g. banking) the data itself may be sensitive and the less secure domain should be prevented from accessing operands being passed between secure libraries. For such applications, the function call between different secure libraries 100 may take place entirely in the secure domain, as shown in FIG. 7, and the library manager 110 may perform the security protection functions which would normally be performed by the security protection hardware 40. Hence, the transition between libraries is provided with the same protection as the transition between the less secure domain and the secure domain, but without the hardware being invoked. While performing the security measures in software is slower than using the hardware, this approach maintains the security of any operands passed between the libraries.

For some systems, both of the techniques shown in FIGS. 6 and 7 may be supported. For a given function call between secure libraries, the library manager 110 may detect whether the call went via the less secure domain 80. If so, it can be assumed that the hardware will perform the security protection operations. If the call did not go via the less secure domain 80, then the library manager 110 performs the security protection operations, in other embodiments, only one or other of the techniques shown in FIGS. 6 and 7 may be supported.

When performing a function call, conventional systems typically use the general purpose registers 8 to pass arguments. If there is not enough space in the general purpose registers, then the stack can be used to pass excess arguments. However, this approach cannot be used when one secure library 100 calls another secure library 100 as shown in FIGS. 6 and 7, because the respective libraries 100 have their own stacks 30 in the data store 6 which are not accessible to other libraries 100. If the function arguments are not sensitive, then they can be passed between libraries 100 by storing them to the less secure stack 32 which is accessible by any of the secure libraries 100 in the secure domain 90. On the other hand, if sensitive data is passed between libraries then software methods such as mailboxes provided by the library management software 110 can be used to ensure the security of the arguments.

Figure 8:
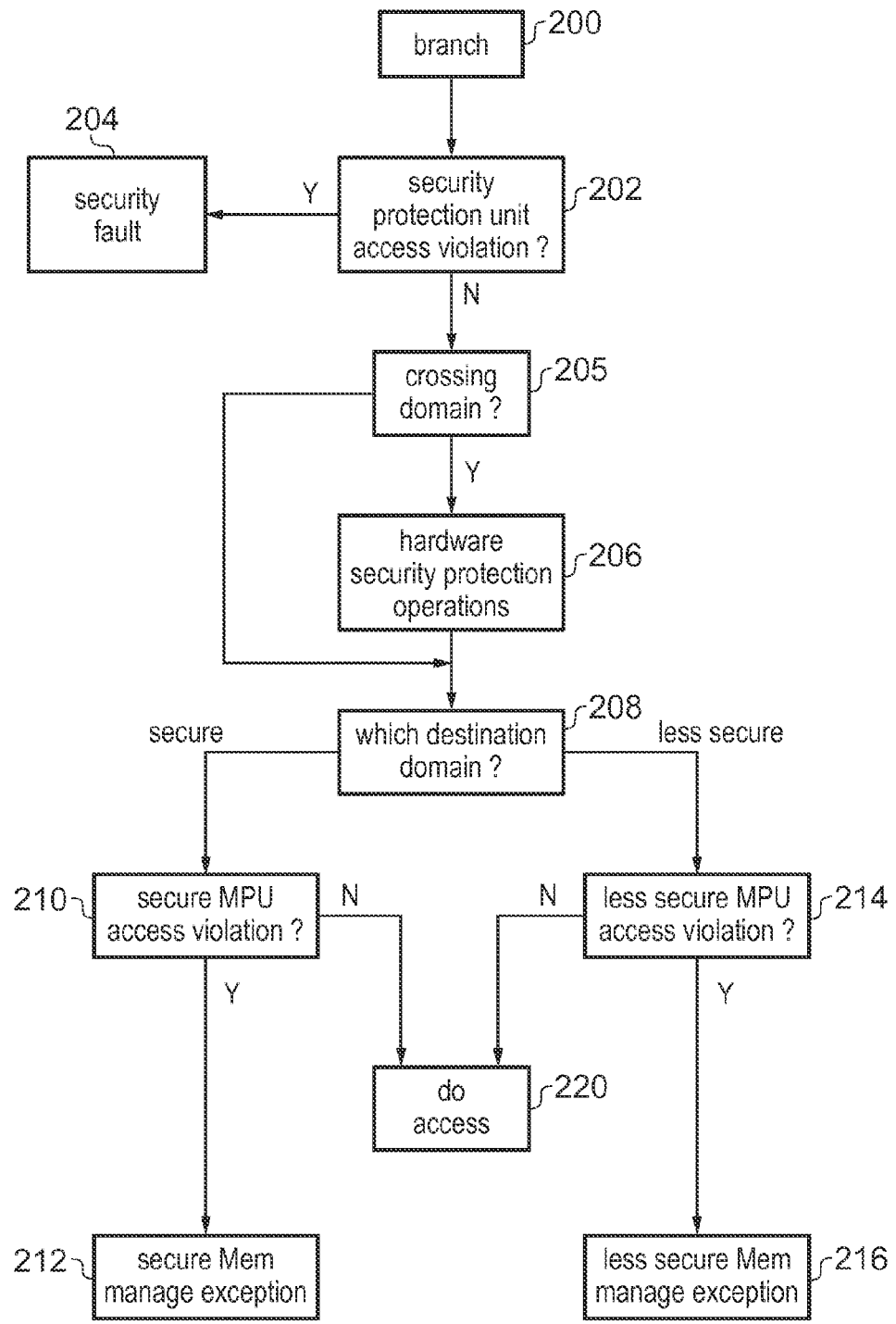
FIG. 8 illustrates a security protection method.

FIG. 8 shows a method of performing security checks using the hardware 40 and the secure and less secure MPUs 50, 52. At step 200 a branch operation occurs to change program flow to an instruction at a target address. At step 202, the security protection unit 42 and the security protection hardware 40 determine whether there is an access violation. An access violation is detected if the current domain of operation is the less secure domain, the target address is in the secure region 44, and the instruction at the target address is not a guard instruction. If an access violation is detected, then the hardware 40 triggers a security fault at step 204. At step 205, the hardware 40 detects whether the branch crosses the boundary 70 between the less secure domain 80 and the secure domain 90. If so, then at step 206 the security protection hardware 40 performs the hardware security protection operations described above. If not, then step 206 is omitted.

At step 208, it is determined whether the branch target address is in the secure domain 90 or the less secure domain 80 (based on which region 44, 46 of the data store 6 includes the target address). If the target address is in the secure domain 90, then at step 210 the secure MPU 50 is active and checks its access permissions for a sub-region including the target address to detect whether there is a secure MPU 50 access violation. The violation may occur because the branch is to an inactive library, or because unprivileged code is seeking to access a privileged region. If there is a secure MPU 50 access violation, then at step 212 a secure memory manage exception is triggered. On the other hand, if the target address is in the less secure domain 80 then at step 214 the less secure MPU 52 is active and determines whether there has been an access violation, and if so then at step 216 a less secure memory manage exception is triggered. If no access violation is detected, then at step 220 the access associated with the branch instruction is carried out and processing continues.

The method similar to the one shown in FIG. 8 may also be performed for data accesses specifying a target address. However, for data accesses, step 208 would detect the domain in which the processing circuitry 4 is currently operating (rather than the domain associated with the target address), and the MPU corresponding to the current domain would then be used at step 210 or step 214.

Figure 9:
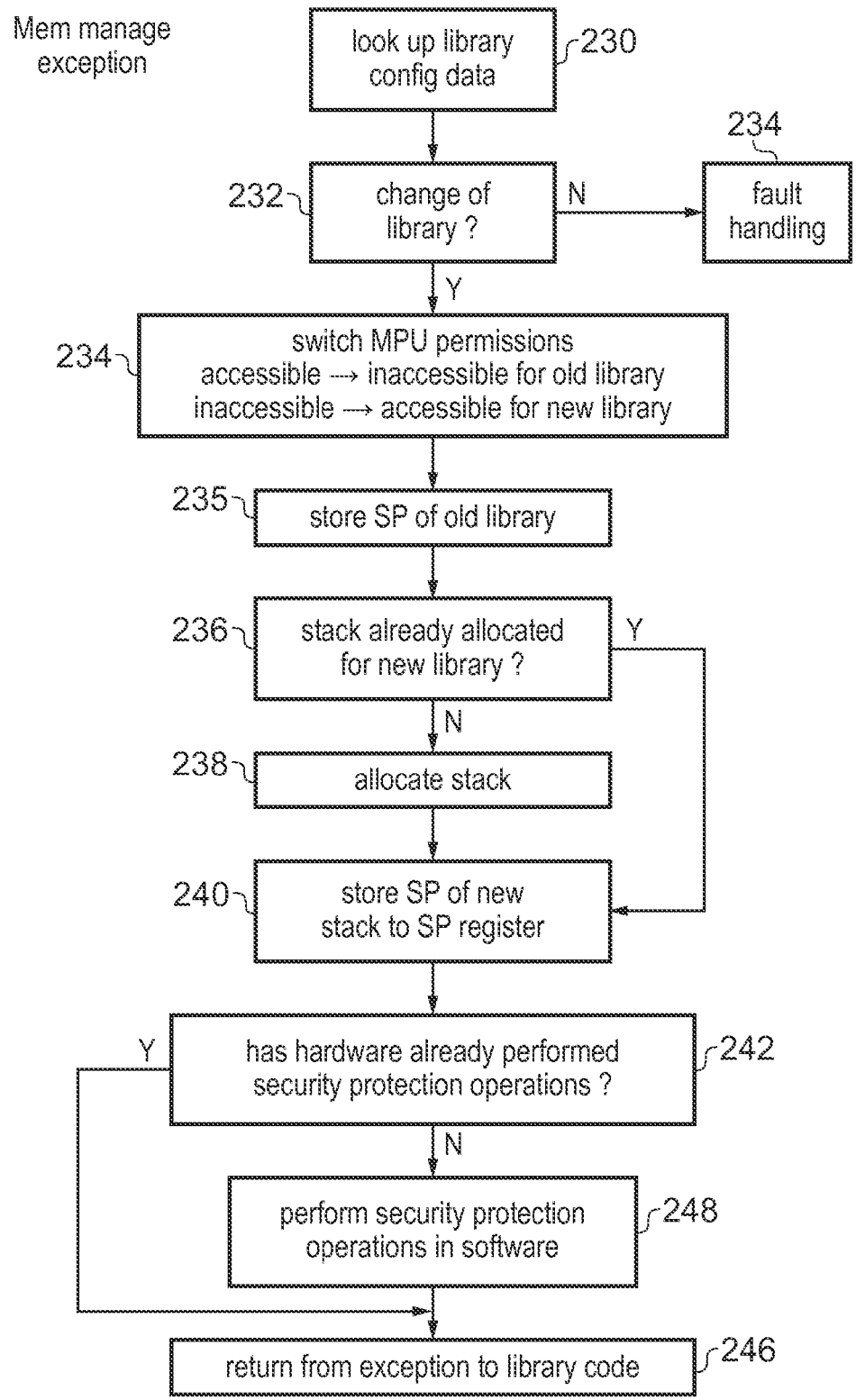
FIG. 9 illustrates a method of performing active library switching in response to a memory protection fault.

FIG. 9 illustrates a method of handling the memory manage exception triggered at steps 212 and 216 of FIG. 8. In the example of FIG. 4, the library manager 110 manages multiple secure software libraries 100 in the secure domain and this technique is not used in the less secure domain. In this case, the method of FIG. 9 would be performed only at step 212 and not at step 216. However, as described below with respect to FIG. 12, it is possible for a similar library manager to be provided in the less secure domain 80, in which case the method of FIG. 9 can also be performed for step 216.

At step 230, the library manager 110 looks up the library configuration data 112, and at step 232 the library manager uses the library configuration data 112 to determine whether there is a change of active library. This can be done in various ways. For example, the target address may be checked against library configuration data 112 defining which MPU regions correspond to each library. However, this can take some time. A quicker approach would be to restructure the library code so that all valid entry points to a library are located within a small, fixed size, region of memory called a "trampoline" region, from which a subsequent branch can be made to the region of code which needs to be executed. By restricting the trampoline regions to which branches to inactive libraries can be made, less configuration data needs to be checked, and so it is quicker to detect which library corresponds to a given access. For example, if the trampoline regions associated with each library 100 are of fixed size and adjacent to each other in the address space, then a library identifier could be calculated quickly using the following formula:

$$\frac{\text{Branch target address} - \text{Base address of library 0 trampoline area}}{\text{Trampoline area size}}$$

Even if the trampoline areas are not all the same size, but are multiples of a fixed size the result of this formula may be used to index into a smaller table to obtain the actual library identifier. Therefore, there are various ways in which the library manager 110 can determine which library corresponds to the target address.

If the target address does not correspond to a change of library 232, then at step 234 fault handling is performed to handle the memory protection fault triggered at 212 or 216. Any known technique for handling memory protection faults may be used. For example, processing may be aborted to prevent access to privileged data by unprivileged code.

On the other hand, if at step 232 it is determined that the memory manage exception has been caused by a change to an inactive library, then this is not as dangerous as other memory protection faults and can be handled by the library manager 110. At step 234, the library manager 110 switches the access permissions of the MPU 50 so that the regions corresponding to a previously active library become inaccessible and the regions corresponding to the newly active library become accessible. From now on, accesses to the old library will trigger the memory protection fault while accesses to the new target library will not. The library configuration data 112 defines which regions should be set as accessible or inaccessible when a particular library becomes active.

At step 235, the library manager 110 stores to the library configuration data 112 the stack pointer of the previously active library which is currently stored in the stack pointer register 24. The stack pointer may have changed since that library was activated and so the stack pointer previously held in the library configuration data 112 may be out of date. By updating the stack pointer for the previously active library in the library configuration data 112, when that library is activated again later on it is possible to determine the location of the corresponding stack.

At step 236, the library manager 110 determines whether a stack 30 has already been allocated for the newly active library. If not then at step 238 a stack for the newly active library is allocated in the data store 6, while if a stack has already been allocated then step 238 is omitted. At step 240 the library manager 110 restores the stack pointer of the stack corresponding to the newly active library to the stack pointer register 24. The new stack pointer is obtained from the library configuration data 112.

At step 242, the library manager 110 determines whether the security protection hardware 40 has already performed the security protection at step 206. This is the case if the branch crossed the boundary 70 between the less secure and the secure domains. If the hardware 40 has already performed the security protection operations then the memory manage exception returns and processing of the library continues at step 246. If the hardware 40 has not already performed the security protection operations, then they are performed in software by the library manager 110 at step 248 before returning from the exception at step 246. The library manager 110 may also perform a second security protection operation regardless of whether the hardware has already performed the first security protection operation. For example, only certain libraries may be allowed to make function calls to a particular library, and function calls from other libraries may be prevented from continuing.

Figure 10:
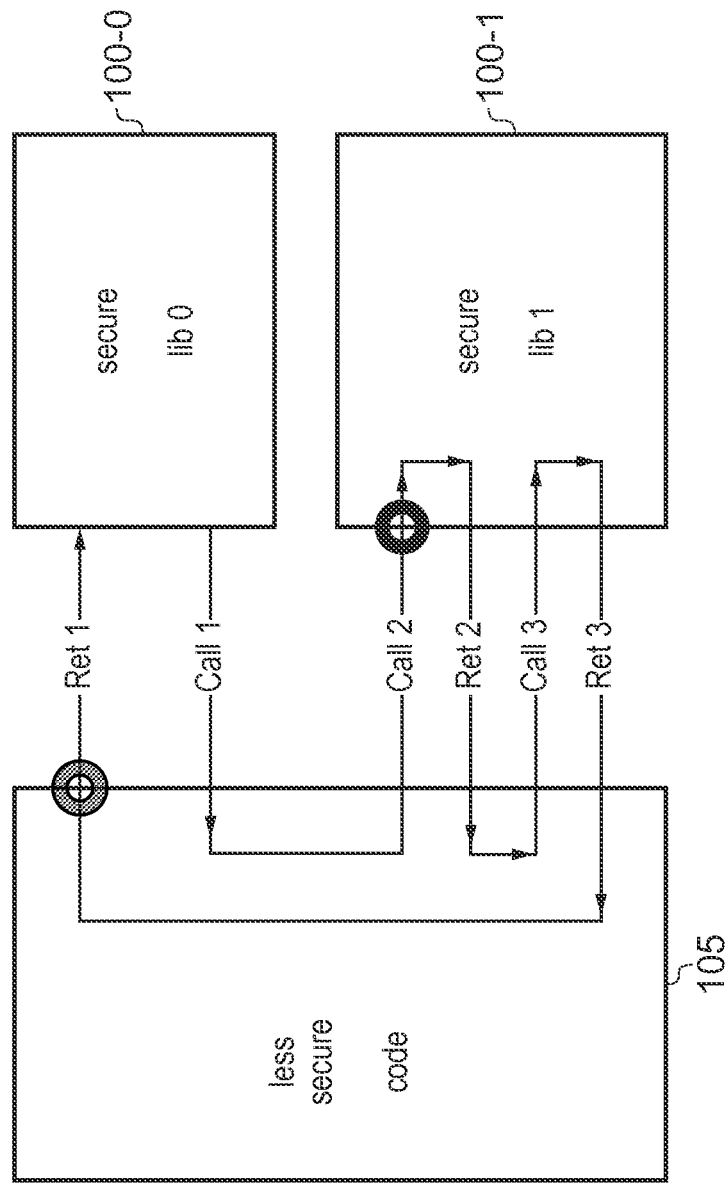
FIG. 10 illustrates an example of nested function calls.

FIG. 10 shows an example of nested function calls between less secure code 105 and two secure libraries 100-0, 100-1. A first function call (Call 1) is made from secure library 100-0 to the less secure code 105. A second function call (Call 2) then occurs from less secure code 105 to secure library 100-1. After a function return (Ret 2) from the second function call, a third function call (Call 3) occurs again targeting secure library 100-1. Following a return (Ret 3) from the third function call, processing then returns (Ret 1) from less secure code 105 to the secure library 100-0 which made the first function call (Call 1).

As discussed above, the security protection hardware 40 may hide the return address of Call 1 to prevent the less secure code 105 accessing the return address. This can be done by storing the function return address of Call 1 to the stack associated with the secure library 100-0 and storing a dummy return address to the link register 22 to trigger the hardware 40 to obtain the real function return address from the stack when performing the function return Ret 11. However, when Call 2 is made to secure library 100-1 then the switch of libraries means that the library 100-0 is deactivated and so when the less secure code 105 performs the function return Ret 1, the function return address is no longer accessible.

Figure 11:
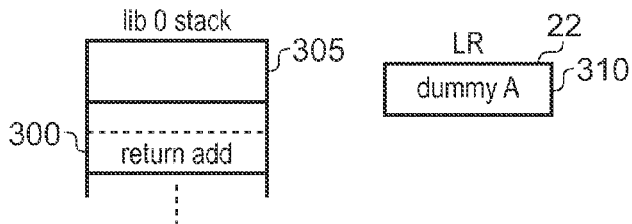
FIG. 11 illustrates an example technique for protecting a function return address when performing the function calls shown in FIG. 10.
Figure 11:
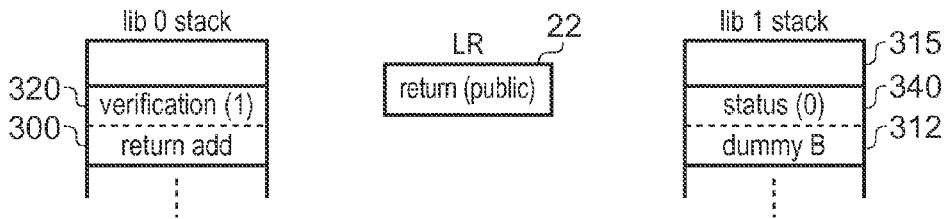
Figure 11:
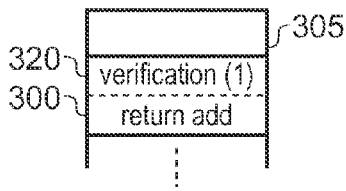

To address this problem, the return address can be handled as shown in FIG. 11. Following Call 1, the actual return address 300 is placed on a stack 305 associated with secure library 100-0 while a dummy address 310 which does not correspond to a valid instruction address is placed in the link register 22. This means that the less secure code 105 processing the first function call can only see the dummy address and cannot see the secure return address 300.

When Call 2 is made from the less secure code 105 to the secure library 100-1, the return address of Call 2 is stored in link register 22 (as Call 2 is made from less secure code 105, it is not necessary to mask the return address and the actual return address can be stored to link register 22). Call 2 also causes the library manager 100 to perform a switch of libraries and stores a verification value 320 to the stack frame of the stack 305 associated with library 100-0 that includes the return address 300. The verification value comprises an identifier of the library 100-1 which is now being activated. Whilst switching the active library from library 100-0 to library 100-1 and switching the stack pointers in the secure stack pointer register 24, the library manager places a second dummy address 312 on the stack 315 associated with secure library 100-1. The library manager 110 uses a different dummy address 312 to the dummy address 310 stored to the link register 22 by the hardware, to indicate that on returning from Call 1 there will need to be a switch of active libraries. The library manager 110 also stores a status value 340 to the stack 315 of library 100-1. The status value 340 indicates the previously active library 100-0, and therefore the library to reactivate when processing return 1.

On returning from Call 2 (function return Ret 2), processing branches to the address stored in the link register 22. Call 3 and its corresponding function return Ret 3 are handled in the same way as Call 2 and Ret 2, except that now secure library 1 is active no exceptions are generated and no overhead associated with the library manager is encountered.

After Ret 3, the function return Ret 1 occurs, corresponding to the original function call Call 1. The less secure code 105 branches to the original dummy value 310 that was placed in the link register when Call 1 was made. The hardware detects this branch to a reserved address and retrieves the return address from the currently active secure stack 315. As the address retrieved is actually the reserved non executable dummy address 312 previously placed on the stack by the library management software 110, a memory management exception is raised by the hardware. The library management software 110 handles this exception and determines that it needs to perform active library switching. The library management software 110 detects from the status information 340 that library 100-0 should become active and that library 100-1 should now become inactive. The library management software 110 checks the verification information 320 stored on the stack 305 of library 100-0, to ensure that the verification information 320 indicates the library 100-1 is the library to be made inactive and the status information 340 has not been modified. On the other hand, if the status value 340 had been modified while on the stack 315 associated with the library 100-1, then a different library would be indicated as needing to be reactivated whose stack would not contain the verification value 320 in its return address stack frame, and the absence of the correct verification value 320 is detected by the library management software 110 which triggers a fault.

Hence, the status value 340 and verification value 320 enable the library manager 110 to determine which library to switch back to following the called function and to verify that this has been carried out correctly. Therefore, even when a switch of active libraries occurs, it is still possible to use the stacks to prevent less secure code 105 accessing a secure return address.

Once the integrity of the status information 340 has been verified the library manager software 110 can cause processing to resume at the return address 300 specified on the stack of library 0 305.

Figure 12:
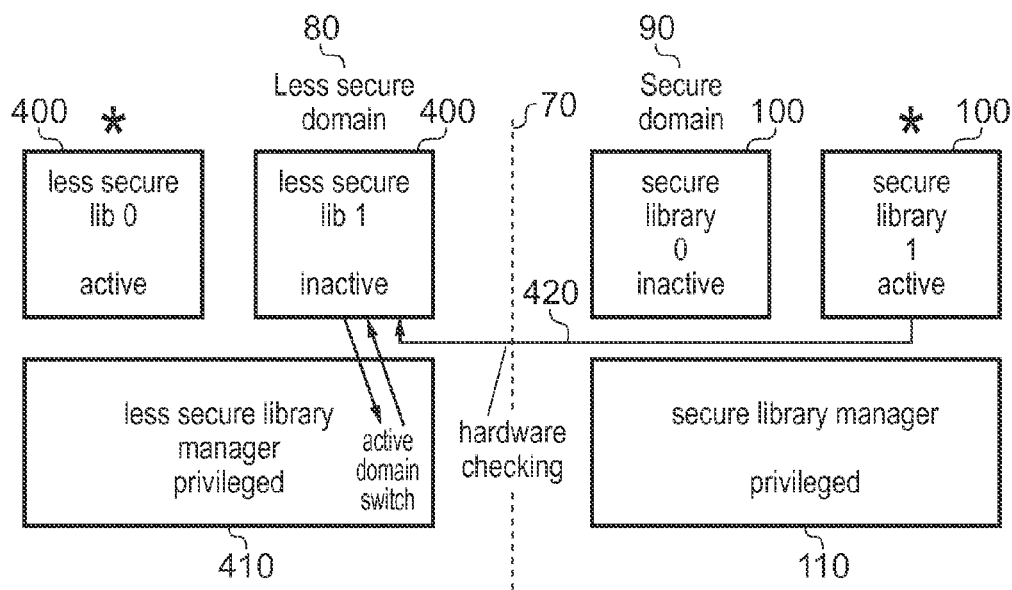
FIG. 12 illustrates an example in which the secure domain and less secure domain each have library management software for controlling switching between libraries in that domain.

While FIG. 4 shows an example in which the library manager 110 enforces protection between several secure software libraries 100 in the secure domain 90, it is also possible to use this technique for the libraries in the less secure domain 80. FIG. 12 shows an example in which a less secure library manager 410 is provided which is similar to the secure library manager 110. The secure library manager 110 selects an active secure library 100 and one or more inactive secure libraries 100, and the less secure library manager 410 selects an active less secure library 400 and one or more inactive less secure libraries 400. Accesses 420 to inactive libraries in either domain 80, 90 trigger the corresponding library manager 110, 410 to perform library switching. Security protection operations are performed by the security protection hardware 40 when an access 420 crosses the domain boundary 70. When switching between libraries in the same domain, the hardware 40 can be invoked by temporarily switching domains, or the corresponding library manager 110, 410 can perform the corresponding security protection operations, as shown in FIGS. 6 and 7. In this way, a large number of software libraries may be protected from each other in both the less secure domain 80 and the secure 90 with little hardware overhead.

Additional examples of security protection operations which may be performed by the security protection hardware 40 are described in commonly-assigned UK patent applications 1220769.2 and 1217531.1 and U.S. patent application Ser. Nos. 13/368,419, 13/680,298 and 13/741,709, the contents of which are incorporated herein by reference.

Although illustrative embodiments of the invention have been described in detail herein with reference to the accompanying drawings, it is to be understood that the invention is not limited to those precise embodiments, and that various changes and modifications may be effected by those skilled in the art without departing from the scope and spirit of the invention as defined by the claims.

I claim:

1. A data processing apparatus comprising:
processing circuitry for performing data processing in response to instructions, the processing circuitry having a plurality of domains of operation including a secure domain and a less secure domain, wherein at least some data accessible to the instructions when operating in the secure domain is inaccessible when operating in the less secure domain;
security protection hardware configured to perform a first security protection operation in response to the processing circuitry calling between the less secure domain and the secure domain; and
a data store configured to store a plurality of software libraries and library management software for execution by the processing circuitry; wherein:
the library management software is configured to control the processing circuitry to set at least one of the plurality of software libraries as an active software library which is executable by the processing circuitry, and to set at least one other software library as an inactive software library which is not executable by the processing circuitry; and
in response to the processing circuitry calling a target inactive software library, the library management software is configured to perform active library switching to control the processing circuitry to set the target inactive software library as an active software library and to set a previously active software library as an inactive software library.

2. The data processing apparatus according to claim 1, wherein the plurality of software libraries comprise a plurality of secure software libraries for executing in the secure domain.

3. The data processing apparatus according to claim 1, wherein in response to the processing circuitry calling the target inactive software library, the library management software is configured to control said processing circuitry to perform a second security protection operation and, if said second security protection operation is successful, to perform the active library switching.

4. The data processing apparatus according to claim 1, comprising a memory protection unit configured to store access permissions indicating whether regions of the data store are accessible or inaccessible, wherein said memory protection unit is configured to trigger a fault condition in response to an instruction fetch or a memory access to an inaccessible region;
wherein the active library switching comprises controlling the processing circuitry to set the access permissions of the memory protection unit to indicate as accessible at least one region of the data store corresponding to said target inactive software library and to indicate as inaccessible at least one region of the data store corresponding to said previously active software library.

5. The data processing apparatus according to claim 4, wherein in response to the processing circuitry calling the target inactive software library, the memory protection unit is configured to detect from the access permissions that a region corresponding to the target inactive software library is inaccessible, and to trigger an exception for causing the library management software to perform the active library switching.

6. The data processing apparatus according to claim 1, wherein the data store is configured to store a stack for at least some of the plurality of software libraries; and
the data processing apparatus comprises a stack pointer storage location configured to store a stack pointer corresponding to the stack for the active software library.

7. The data processing apparatus according to claim 6, wherein the active library switching comprises controlling the processing circuitry to update the stack pointer storage location to store a stack pointer corresponding to the stack for the target inactive software library.

8. The data processing apparatus according to claim 6, wherein if the data store does not already store a stack for the target inactive software library, then the active library switching comprises allocating a stack in the data store for the target inactive software library.

9. The data processing apparatus according to claim 1, wherein the security protection hardware comprises a security protection unit configured to store security data defining at least one secure region of the data store associated with the secure domain and at least one less secure region of the data store associated with the less secure domain; and
the processing circuitry is configured to select whether to operate in the secure domain or the less secure domain in dependence on whether the instruction being processed is in a secure region or a less secure region of the data store.

10. The data processing apparatus according to claim 1, wherein the first security protection operation comprises at least one of:
  (i) checking whether a first instruction to be executed following a protected change of program flow is an allowed target instruction for the change of program flow;
  (ii) in response to a protected function call for triggering processing of a function, preventing instructions of the function from accessing a function return address identifying the instruction to be processed after the function has been processed; and
  (iii) checking whether the one of the secure domain and the less secure domain to which processing is switched in response to a protected change of program flow is an allowed domain specified for the change of program flow.

11. The data processing apparatus according to claim 1, wherein in response to the processing circuitry switching from an instruction of said active software library executed in one of said secure domain and said less secure domain to an instruction of said target inactive software library to be executed in said one of said secure domain and said less secure domain, said processing circuitry is configured to temporarily switch to the other of said secure domain and said less secure domain before switching to said instruction of said target inactive software library in said one of said secure domain and said less secure domain.

12. The data processing apparatus according to claim 1, wherein in response to the processing circuitry switching from an instruction of said active software library executed in one of said secure domain and said less secure domain to an instruction of said target inactive software library to be executed in said one of said secure domain and said less secure domain, said processing circuitry is configured to remain in said one of said secure domain and said less secure domain and said library management software is configured to control said processing circuitry to perform said first security protection operation.

13. The data processing apparatus according to claim 1, wherein in response to the active software library making a protected function call for calling a function to be performed by other software, the first security protection operation comprises storing a function return address of said function to a stack associated with said active software library.

14. The data processing apparatus according to claim 13, wherein in response to the protected function call, the first security protection operation comprises storing a dummy function return address to a link register, the dummy function return address comprising an address which does not correspond to a valid instruction address; and
  in response to a function return to the dummy function return address, the security protection hardware is configured to read the function return address from the stack associated with said active software library and trigger a function return to said function return address.

15. The data processing apparatus according to claim 1, wherein on performing active library switching to another software library after a protected function call has been made from the active software library, the library management software is configured to control the processing circuitry to set information to indicate that there has been a switch of active library; and
  on a function return corresponding to the protected function call, if the information is set to indicate that there has been a switch of active library, then the library management software is configured to perform the active library switching back to the active software library which made the protected function call.

16. The data processing apparatus according to claim 15, wherein said information comprises an invalid return address which does not correspond to a valid instruction address; and
  the library management software is configured to perform the active library switching back to the active software library which made the protected function call in response to an exception triggered by a function return to the invalid return address.

17. The data processing apparatus according to claim 15, wherein said information is stored to a stack of the other software library.

18. The data processing apparatus according to claim 13, wherein in response to the protected function call, the library management software is configured to control the processing circuitry to maintain status information indicating which of the plurality of software libraries made the protected function call.

19. The data processing apparatus according to claim 18, wherein if the software library which made the protected function call is an inactive software library after the processing of the function is complete, then the library management software is configured to perform the active library switching to control the processing circuitry to set as the active software library the software library which the status information indicates made the function call.

20. The data processing apparatus according to claim 18, wherein on performing active library switching to another software library after said protected function call and before a function return corresponding to said protected function call, said library management software is configured to control said processing circuitry to store said status information to a stack associated with said other software library.

21. The data processing apparatus according to claim 18, wherein in response to the protected function call, the library management software is configured to control the processing circuitry to store verification information to said stack associated with said active software library; and
  after processing of the function is complete, the library management software is configured to control the processing circuitry to check the verification information to detect whether the status information has been modified.

22. A data processing apparatus comprising:
  processing means for performing data processing in response to instructions, the processing means having a plurality of domains of operation including a secure domain and a less secure domain, wherein at least some data accessible to the instructions when operating in the secure domain is inaccessible when operating in the less secure domain;
  security protection hardware means for performing a first security protection operation in response to the processing means calling between the less secure domain and the secure domain; and
  storing means for storing a plurality of software libraries and library management software for execution by the processing means; wherein:
  the library management software is configured to control the processing means to set at least one of the plurality of software libraries as an active software library which is executable by the processing means, and to set at least one other software library as an inactive software library which is not executable by the processing means; and
  in response to the processing means calling a target inactive software library, the library management software is configured to perform active library switching to control the processing means to set the target inactive software library as an active software library and to set a previously active software library as an inactive software library.

23. A method of data processing for an apparatus comprising
- processing circuitry having a plurality of domains of operation including a secure domain and a less secure domain, wherein at least some data accessible to the instructions when operating in the secure domain is inaccessible when operating in the less secure domain, and a data store storing a plurality of software libraries and library management software for execution by the processing circuitry; the method comprising:
- under control of the library management software, the processing circuitry setting at least one of the plurality of software libraries as an active software library which is executable by the processing circuitry and setting at least one other software library as an inactive software library which is not executable by the processing circuitry;
- in response to the processing circuitry calling between the less secure domain and the secure domain, security protection hardware performing a first security protection operation; and
- in response to the processing circuitry calling a target inactive software library, the library management software performing active library switching to control the processing circuitry to set the target inactive software library as the active software library and to set a previously active software library as the inactive software library.

* * * * *